United States Patent [19]

Wolf et al.

[11] Patent Number: 6,073,773

[45] Date of Patent: Jun. 13, 2000

[54] SEPARATION OF SEMICONDUCTOR MATERIAL

[75] Inventors: Reinhard Wolf, Emmerting; Dirk Flottmann, Altötting, both of Germany

[73] Assignee: Wacker-Chemie GmbH, München, Germany

[21] Appl. No.: 09/410,339

[22] Filed: Oct. 1, 1999

[30] Foreign Application Priority Data

Oct. 13, 1998 [DE] Germany ............................ 198 47 099

[51] Int. Cl.[7] ................................ B07B 1/22; B03B 9/00
[52] U.S. Cl. .................................. 209/2; 209/3; 209/352; 209/380; 209/379; 209/11
[58] Field of Search ........................... 209/2, 3, 11, 268, 209/273, 352, 379, 380, 392, 393

[56] References Cited

U.S. PATENT DOCUMENTS

| | | | |
|---|---|---|---|
| 3,748,830 | 7/1973 | Ross et al. .................................. | 55/89 |
| 4,430,150 | 2/1984 | Levine et al. ............................ | 156/616 |
| 5,165,548 | 11/1992 | Dumler et al. . | |
| 5,259,955 | 11/1993 | Bolton ...................................... | 210/406 |
| 5,593,585 | 1/1997 | Groetzinger ............................. | 210/409 |
| 5,791,493 | 8/1998 | Meyer ...................................... | 209/245 |

FOREIGN PATENT DOCUMENTS

| | | |
|---|---|---|
| 0497497 | 1/1992 | European Pat. Off. . |
| 4113093 | 10/1991 | Germany . |
| 197 16 374 | 10/1998 | Germany . |

OTHER PUBLICATIONS

Derwent Abstract Corresponding to DE 197 16 374 (AN 1998–558468).
English Abstract Corresp. to DE 41 13 093.

*Primary Examiner*—Donald P. Walsh
*Assistant Examiner*—David A Jones
*Attorney, Agent, or Firm*—Collard & Roe, P.C.

[57] ABSTRACT

A method and a device for the separation of semiconductor material has the separation procedure carried out on screens coated with ice made of ultrapure water, optionally mixed with particles of semiconductor material. During the separation, the screens are sprayed with ultrapure water and the screen holes are cut free.

10 Claims, No Drawings

SEPARATION OF SEMICONDUCTOR MATERIAL

BACKGROUND OF THE INVENTION

1. Field of the Invention

The present invention relates to a method for the contamination-free separation of semiconductor material, and to a device for carrying out the method.

2. The Prior Art

For the production of solar cells or electronic components, for example memory elements or microprocessors, ultrapure semiconductor material is required. Silicon is the most commonly used semiconductor material in the electronics industry. Pure silicon is obtained by thermal decomposition of silicon compounds, for example trichlorosilane, and in this context is often in the form of polycrystalline ingots. The ingots are needed as starting material, for example, for the production of single crystals. For the production of single crystals using the Czochralski method, the ingots firstly need to be comminuted into fragments of about 100 mm. These fragments are melted in a crucible and the single crystal is then pulled from the resulting melt. In the best possible case, the only contamination in the semiconductor material should then be the dopant deliberately introduced into the semiconductor material.

A variety of methods for the separation of the silicon fragments obtained during the comminution procedure are known. In order to prevent contamination during separation due to the screens, etched silicon plates are frequently applied to the screens. Individual screens, for example ones with a hole diameter less than 40 mm, may consist entirely of shaped silicon parts. Screens of this type do, however, have the disadvantage that they wear out or become damaged during the transfer of forces during the separation procedure and need to be replaced. It is not possible to use the screening system while the broken parts are being replaced.

Added to this is the fact that the production of silicon-coated screens as well as silicon screens is expensive. It generally requires the additional deposition of the silicon, mechanical processing during the production of the shaped parts and expensive cleaning thereof, for example by etching with $HF/HNO_3$. Since no pieces of the coating or of the shaped parts may enter the screened fragments, the latter need to be manually sorted and checked.

SUMMARY OF THE INVENTION

It is an object of the present invention to overcome the disadvantages of the prior art and to provide a device and a method which reduces additional contamination of semiconductor material during the separation thereof. This object is achieved by the present invention.

The present invention relates to a method for the separation of semiconductor material, wherein the separation procedure is carried out on screens coated with ice made of ultrapure water, optionally mixed with particles of semiconductor material; and during the separation, the screens are sprayed with ultrapure water and the screen holes are cut free.

The method according to the invention may include any desired hitherto known screening steps, for example, wherein screening with vibrating screens is preferred because the separation is especially good.

The invention also relates to a device for the separation of semiconductor material, wherein the screens are constructed from tube networks and have an ice layer coating made of pure water, optionally mixed with particles of semiconductor material.

The device according to the invention, and the method according to the invention, are preferably used to comminute semiconductor material such as silicon, germanium or gallium arsenide-silicon, in particular ultrapure polysilicon, being preferred. However, any of the desired solid materials may be separated by screening by this means.

The device according to the invention is produced by constructing the screens from tube networks, which may be made from steel, plastic or other suitable material, on whose surface is a coating comprising an ice layer made of ultrapure water, optionally mixed with particles of semiconductor material.

The screens which are coated with ice in order to produce the device according to the invention, may in principle be the same as those which have hitherto been used in methods for the separation of semiconductor material by screening. Thus the screens may, in particular, be coated with ultrapure silicon.

The ice layer of the device according to the invention is produced by depositing ultrapure water on the surface of the screens. There is a refrigerant, for example preferably an aqueous potassium carbonate solution, flowing through the tube networks of the screens. The refrigerant is cooled in a refrigerator to preferably below $-15°$ C. and, particularly preferably, to below $-25°$ C., and is pumped through the tube network. During the cooling procedure, and the time which follows, the screens are sprayed with ultrapure water, which has a conductivity of preferably less than 0.01 $\mu$m/cm. The spraying procedure is continued until the layer has grown preferably to a thickness of from 0.3 cm to 3 cm, particularly preferably to from 0.5 cm to 1 cm. The tube networks of the screens are dimensioned in the device according to the invention in such a way that the screen holes have the desired size in spite of the ice layer around the tubes.

According to the method according to the invention, the screens are further sprayed with ultrapure water during the separation of semiconductor fragments, so that any holes and cracks which appear in the coating are immediately closed up again. A further effect of the spraying according to the invention of the semiconductor fragments during the separation procedure is that the semiconductor dust which is normally formed becomes precipitated. This has the advantageous side effect that the ice layer thus obtained and infiltrated with semiconductor dust has a very long life since stresses are reduced compared with a pure ice coating layer.

In order for the size of the screen holes to remain constant during the separation, they are regularly cut free in order to obtain an invariant target size for the separation procedure (fragment size). The screen holes may, for example, be cut free using high pressure water jets or infrared lasers.

By utilizing the thickness of the ice layer within the cross section of the screen holes, it is possible to control the target size for the separation procedure within certain limits by tailored cutting. This advantageously affords the method according to the invention a high degree of flexibility.

It is desirable when the method according to the invention is being carried out, that the device according to the invention will be cooled in order to prevent the ice layers from thawing.

The method according to the invention furthermore has the advantage that, because of the constant regeneration of the ice coating, the separation procedure can be carried out more or less without process interruption.

If desired, the screen used in the method according to the invention may also comprise two trough-like screen parts which are connected to one another and may be cooled independently of one another. While one screen is being used in a horizontal position, the second screen is thawed and re-iced. The second screen is subsequently swung horizontally during a brief process interruption into the place of the first screen in the path of the silicon fragments. The separation procedure can then continue immediately with the second screen while the regeneration of the first screen is being carried out.

After the separation procedure, the screening fractions which are obtained may, if necessary, be dried and have the silicon dust removed using known methods. The material may be dried, for example, using radiation heaters. In order to remove fine dust, the material is, for example, blown with pressurized air.

The otherwise customary checking to prevent contamination of the semiconductor product by a damaged separation device may be omitted, which is a great advantage.

Further, the method according to the invention has the advantage that semiconductor material can be separated free from contamination.

Accordingly, while a few embodiments of the present invention have been shown and described, it is to be understood that many changes and modifications may be made thereunto without departing from the spirit and scope of the invention as defined in the appended claims.

What is claimed is:

1. A method for separation of semiconductor material, comprising
    separating fragments of semiconductor material by passing said fragments through screens coated with a coating selected from the group consisting of ice made of ultrapure water and ice made of ultrapure water mixed with particles of semiconductor material;
    during the separating, spraying the screens with ultrapure water; and
    cutting screen holes free.
2. The method as claimed in claim 1,
    wherein the semiconductor material is silicon.
3. The method as claimed in claim 1, comprising
    cutting the screen holes free using high pressure water jets.
4. The method as claimed in claim 1, comprising
    cutting the screen holes free using infra red lasers.
5. A device for separation of semiconductor material, comprising
    screens constructed from tube networks; and
    said tube networks each have a coating thereon selected from the group consisting of an ice layer made of ultrapure water, and an ice layer made of ultrapure water mixed with particles of semiconductor material.
6. The device as claimed in claim 5,
    wherein the semiconductor material is silicon.
7. The device as claimed in claim 5, further comprising
    means for spraying the screens with ultrapure water during the separation.
8. The device as claimed in claim 5, further comprising
    means for cutting screen holes free.
9. The device as claimed in claim 8,
    wherein the means for cutting the screen holes free comprises high pressure water jets.
10. The device as claimed in claim 8,
    wherein the means for cutting the screen holes free comprises infra red lasers.

* * * * *